3,303,095
COMPOSITIONS AND METHODS FOR PRODUCING TRANQUILIZING ACTIVITY
David H. Tedeschi, Pennsauken, N.J., assignor to Smith Kline & French Laboratories, Philadelphia, Pa., a corporation of Pennsylvania
No Drawing. Filed Dec. 26, 1963, Ser. No. 333,621
11 Claims. (Cl. 167—65)

This invention relates to tranquilizer compositions and methods of producing tranquilizing activity. More specifically the tranquilizer compositions of this invention comprise in dosage unit form a nontoxic pharmaceutical carrier and a substituted pyrimidine of the following formula:

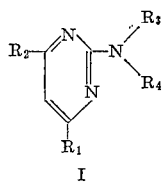

I in which:

$R_1$ represents chlorine, bromine or methyl;
$R_2$ represents chlorine, methyl, ethyl, methoxy or trifluoromethyl;
$R_3$ represents hydrogen or methyl; and
$R_4$ represents hydrogen, methyl, ethyl, propyl, isopropyl or cyclopropyl.

A preferred composition in accordance with this invention comprises the compound 2-(N,N-dimethylamino)-4-chloro-6-methylpyrimidine.

The substituted pyrimidines of Formula I above which comprise the active ingredient of the novel compositions of this invention have pharmacological properties similar to meprobamate, a known tranquilizer, but are of unrelated chemical structure. The tranquilizing activity of these pyrimidine compounds is readily demonstrated by their Metrazol antagonist activity in rats, a property which tranquilizing drugs of this type share with anticonvulsant drugs.

The nontoxic pharmaceutically acceptable acid addition salts of the compounds of the above formula are also included within the scope of this invention since such salts are likewise effective for producing tranquilizing activity. Both organic and inorganic acids can be employed to form pharmaceutically acceptable salts, illustrative acids being sulfuric, nitric, phosphoric, hydrochloric, citric, acetic, lactic, tartaric, ethanedisulfonic, sulfamic, succinic, fumaric, maleic, benzoic, hexamic, pamoic and the like. These salts are prepared by methods known to the art.

The pharmaceutical compositions of this invention comprise a substituted pyrimidine of Formula I in an amount sufficient to produce tranquilizing activity. Preferably the compositions contain from about 25 mg. to about 400 mg. of medicament, advantageously from about 30 mg. to about 150 mg. per dosage unit.

The pharmaceutical carrier employed in the composition can be either a solid or liquid. Exemplary of solid carriers are lactose, magnesium stearate, terra alba, sucrose, talc, stearic acid, gelatin, agar pectin or acacia. Exemplary of liquid carriers are peanut oil, olive oil, sesame oil and water. Similarly the carrier or diluent may include a time delay material such as glyceryl monostearate or glyceryl distearate alone or with a wax.

A wide variety of pharmaceutical forms can be employed and are prepared by methods well known to the art. Thus if a solid carrier is used the composition can be tabletted, used as a pharmaceutical powder, placed in a hard gelatin capsule or in the form of a troche or lozenge. If a liquid carrier is used the composition can be in the form of a soft gelatin capsule or a liquid suspension. Parenteral dosage forms are obtained by dissolving a water-soluble salt of the active medicament in water or saline solution in a concentration such that 1 cc. of the solution contains from about 25 mg. to about 100 mg. of active medicament. The solution can then be filled into single or multiple dose ampules.

The method for using the compositions in accordance with this invention comprises administering inernally to animals, including human beings, a substituted pyrimidine of Formula I or a nontoxic organic or inorganic acid addition salt thereof, preferably with a nontoxic pharmaceutical carrier such as described above, in an amount sufficient to produce tranquilizing activity. The active medicament in dosage units as described above is administered orally or parenterally in repeated dosages in a range of from about 100 mg. to about 1600 mg. daily, advantageously from about 120 mg. to about 600 mg. When the method described above is carried out, tranquilizing activity is produced.

The compounds of Formula I above which form the active medicament in the pharmaceutical compositions and are useful in the method of this invention are either known or are prepared by general procedures well-known to the art. The following examples are not limiting but set forth in more detail preparative procedures for compounds of Formula I and illustrate specific pharmaceutical compositions of this invention.

*Example 1*

A mixture of 12 g. of sodium methoxide in 125 ml. of methyl alcohol and 27.2 g. of 1,1-dimethylguanidino sulfate is refluxed for one-half hour. To the cooled reaction mixture is added 31.6 g. of ethyl acetoacetate and the resulting mixture is refluxed with stirring for 23 hours. The cooled mixture is treated with 100 ml. of water and then carefully acidified with glacial acetic acid. Cooling yields the 2-(N,N-dimethylamino)-4-hydroxy-6-methylpyrimidine and the resulting solution is refluxed for four hours. The cooled reaction mixture is poured onto 100 g. of ice and subsequently neutralized. The neutral solution is extracted with dry ether. The dried ether extract is evaporated and the residue sublimed at room temperature to give the product 2-(N,N-dimethylamino)-4-chloro-6-methylpyrimidine, M.P. 35–36° C.; hexamate salt, M.P. 212° C. (dec.).

The 2 - (N,N-dimethylamino) - 4 - hydroxy-6-methylpyrimidine is also conveniently prepared by reacting 2-ethylmercapto-4-hydroxy-6-methylpyrimidine with aqueous dimethylamine under pressure in a suitable solvent.

*Example 2*

A mixture of 6.0 g. of guanidine carbonate, 10.2 g. of trifluoroacetyl acetone and 15 ml. of trifluoroacetyl acetone as solvent is refluxed for one and three-quarter hours. The solvent is removed in vacuo to give 2-amino-4-methyl - 6 - trifluoromethylpyrimidine which upon recrystallization from ether-water melts at 120–124° C.

*Example 3*

To 25 ml. of methanol is added carefully 3.85 g. of sodium methoxide, the solution is cooled and 5.8 g. of 2-amino-4,6-dichloropyrimidine is added. After stirring at room temperature for 24 hours, the mixture is filtered and the solid washed with methanol and water. This solid is sublimed under reduced pressure to give 2-amino-4-chloro-6-methoxypyrimidine, M.P. 172–174° C.

*Example 4*

To a mixture of 93.5 g. of magnesium turnings and 250 ml. of dry ether is added dropwise with stirring 500 g.

of ethyl iodide dissolved in two liters of ether. The reaction mixture is refluxed for 45 minutes and 140 g. of ethyl cyanoacetate dissolved in 375 ml. of ether is added dropwise. Refluxing is then continued for one hour, the cooled solution poured onto ice and then acidified with concentrated sulfuric acid. The dried ether layer is concentrated to give ethyl propionyl acetate, B.P. 98–108° C./ 38–40 mm.

A mixture of 43.3 g. of ethyl propionyl acetate and 55.4 g. of guanidine carbonate in 330 ml. of absolute ethanol is heated at reflux with stirring for 18 hours. Water (60 ml.) is added and refluxing is continued for an additional two hours. Cooling precipitated the 2-amino-4-hydroxy-6-ethylpyrimidine, M.P. 249–251° C.

Treating the hydroxypyrimidine with phosphorus oxychloride as described in Example 1 yields 2-amino-4-chloro-6-ethylpyrimidine, M.P. 121–123° C.

Example 5

A mixture of 200 ml. of dimethylformamide, 5.4 g. of sodium methoxide, 27.2 g. of 1,1-dimethylguanidine sulfate and 41.7 g. of diethyl malonate is heated to reflux for five hours. The reaction mixture is filtered hot and the filtrate is cooled and concentrated to give solid 2-(N,N-dimethylamino)-4,6-dihydroxypyrimidine, M.P. 356° C.

The dihydroxypyrimidine (4.6 g.) and 20 ml. of phosphorus oxychloride are reacted as described in Example 1 to yield 2-(N,N-dimethylamino)-4,6-dichloropyrimidine, M.P. 55–56° C.

Example 6

A mixture of 100 g. of methylguanidine sulfate, 500 ml. of dimethylformamide and 44.2 g. of sodium methoxide is heated to reflux, cooled and 53.2 g. of ethyl acetoacetate is carefully added with stirring. The resulting mixture is refluxed for five hours and then filtered. The filtrate is concentrated and the residue taken up in acetone to give the solid 2-methylamino-4-hydroxy-6-methylpyrimidine which is reacted with phosphorus oxychloride as described in Example 1 to yield 2-methylamino-4-chloro-6-methylpyrimidine, M.P. 135–135.5° C.

The 2-methylamino-4-chloro-6-methylpyrimidine is also conveniently prepared by reacting 2-ethylmercapto-4-hydroxy-6-methylpyrimidine with methylamine under pressure followed by treatment with phosphorus oxychloride.

Example 7

A solution of 10.0 g. of 2-ethylmercapto-4-hydroxy-6-methylpyrimidine and 20 ml. of aqueous ethylamine containing 8.9 g. of amine in 25 ml. of cellosolve is placed in a pressure bottle and the bottle heated at 170–180° C. for eight hours in an oil bath. The cooled reaction mixture is evaporated and the residue taken up in ether. Cooling gives the solid 2-ethylamino-4-hydroxy-6-methylpyrimidine, M.P. 170–174° C.

The hydroxypyrimidine (8.9 g.) is treated with 20 ml. of phosphorus oxychloride as described in Example 1 to yield 2-ethylamino-4-chloro-6-methylpyrimidine, M.P. 92.5–94.5° C.

Similarly by reacting 2-ethylmercapto-4-hydroxy-6-methylpyrimidine with propylamine followed by treatment with phosphorus oxychloride gives the corresponding 2-propylamino-4-chloro-6-methylpyrimidine, M.P. 49–50.5° C.

Example 8

A mixture of 114 g. of phosphorus oxybromide and 25.3 g. of 2-amino-4-hydroxy-6-methylpyrimidine is heated at 135° C. in an oil bath for one hour. The hot reaction mixture is poured onto ice and then treated with 40% sodium hydroxide solution to approximately pH 9. Filtration gives the solid 2-amino-4-bromo-6-methylpyrimidine which is purified via the picrate salt. The regenerated free base, recrystallized from ethanol, melts at 152.5–154° C.

Example 9

A mixture of 10.0 g. of 2-ethylmercapto-4-hydroxy-6-methylpyrimidine, 16 ml. of cyclopropylamine and 25 ml. of cellosolve is heated in a pressure bottle at 160–170° C. for ten hours. The cooled reaction mixture is evaporated to dryness and the residue boiled with isopropanol to give a solid, 2-cyclopropylamino-4-hydroxy-6-methylpyrimidine, M.P. 220–223° C.

The hydroxypyrimidine (3.3 g.) is treated with 10 ml. of phosphorus oxychloride at 60–80° C. for about 30 minutes and then allowed to stand at room temperature for one hour. The mixture is poured onto ice, neutralized and extracted with chloroform. The extract is evaporated, the residue taken up in hexane and solution again evaporated to give liquid 2-cyclopropylamino-4-chloro-6-methylpyrimidine, B.P. 82° C./0.14 mm.; hydrochloride salt, M.P. 174–176° C.

Example 10

A solution of 10.0 g. of 2-ethylmercapto-4-hydroxy-6-methylpyrimidine, 20 ml. of isopropylamine and 25 ml. of cellosolve in a pressure bottle is heated at 170–190° C. for eight hours. The cooled reaction mixture is evaporated under reduced pressure and the residue taken up in ether. The solid 2-isopropylamino-4-hydroxy-6-methylpyrimidine (4.3 g.) is warmed with 10 ml. of phosphorus oxychloride and the solution allowed to stand for several hours at room temperature. It is then poured onto ice, neutralized with 40% sodium hydroxide solution and extracted with chloroform. The extract is evaporated to yield an oil, 2-isopropylamino-4-chloro-6-methylpyrimidine, B.P. 68–72° C./0.2 mm.; hydrochloride salt, M.P. 100–102° C.

Example 11

In a pressure bottle, a solution of approximately 0.18 mole of N-ethyl-N-methylamine in approximately 50 ml. of cellosolve (prepared by carefully adding 0.18 mole, 17.2 g. of N-ethyl-N-methylamine hydrochloride to a chilled solution of 7.2 g. of sodium hydroxide in 25 ml. of cellosolve, transferring the mixture to a sintered glass funnel with 20 ml. of cellosolve and collecting in the pressure bottle) is treated in the cold with 10.0 g. of 2-ethylmercapto-4-hydroxy-6-methylpyrimidine. The resulting mixture is heated in an oil bath at 180° C. for 24 hours. The cooled contents is concentrated to give the solid 2 - (N - ethyl - N-methylamino)-4-hydroxy-6-methylpyrimidine, M.P. 152–155° C.

The hydroxypyrimidine (6.7 g.) and 20 ml. of phosphorous oxychloride are heated to reflux, rapidly cooled in an ice bath and allowed to stand for three hours. The mixture is quenched in ice-water, neutralized with 40% sodium hydroxide solution and extracted with chloroform. The dried extract is concentrated and distilled at 58–59° C./0.3 mm. to give 2-(N-ethyl-N-methylamino)-4-chloro-6-methylpyrimidine.

Example 12

Various strength capsules are prepared containing 2-(N,N-dimethylamino)-4-chloro-6-methylpyrimidine either as the free base or an equivalent amount of a nontoxic pharmaceutically acceptable acid addition salt thereof from the following ingredients:

| Medicament, mg. | Lactose, mg. | Magnesium Stearate, m.g |
|---|---|---|
| 25 | 300 | 2.0 |
| 50 | 250 | 3.0 |
| 100 | 110 | 3.0 |

The above ingredients are screened, mixed and filled into #2 hard gelatin capsules.

What is claimed is:
1. A pharmaceutical composition having tranquilizing activity, in dosage unit form, comprising a pharma- ceutical carrier and from about 25 mg. to about 400 mg. of a compound selected from the group consisting of a pyrimidine and a nontoxic pharmaceutically acceptable acid addition salt thereof, said pyrimidine having the following structural formula:

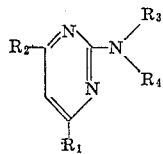

in which:

$R_1$ is a member selected from the group consisting of chlorine, bromine and methyl;
$R_2$ is a member selected from the group consisting of chlorine, methyl, ethyl, methoxy and trifluoromethyl;
$R_3$ is a member selected from the group consisting of hydrogen and methyl; and
$R_4$ is a member selected from the group consisting of hydrogen, methyl, ethyl, propyl, isopropyl and cyclopropyl.

2. A pharmaceutical composition having tranquilizing activity, in dosage unit form, comprising a pharmaceutical carrier and from about 30 mg. to about 150 mg. of a compound selected from the group consisting of a pyrimidine and a nontoxic pharmaceutically acceptable acid addition salt thereof, said pyrimidine having the following structural formula:

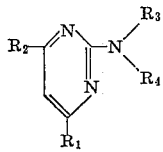

in which:

$R_1$ is a member selected from the group consisting of chlorine, bromine and methyl;
$R_2$ is a member selected from the group consisting of chlorine, methyl, ethyl, methoxy and trifluoromethyl;
$R_3$ is a member selected from the group consisting of hydrogen and methyl; and
$R_4$ is a member selected from the group consisting of hydrogen, methyl, ethyl, propyl, isopropyl and cyclopropyl.

3. A pharmaceutical composition having tranquilizing activity, in dosage unit form, comprising a pharmaceutical carrier and from about 25 mg. to about 400 mg. of a compound selected from the group consisting of 2-(N,N-dimethylamino)-4-chloro-6-methylpyrimidine and a nontoxic pharmaceutically acceptable acid addition salt thereof.

4. A pharmaceutical composition having tranquilizing activity, in dosage unit form, comprising a pharmaceutical carrier and from about 30 mg. to about 150 mg. of a compound selected from the group consisting of 2-(N,N-dimethylamino)-4-chloro-6-methylpyrimidine and a nontoxic pharmaceutically acceptable acid addition salt thereof.

5. A method of producing tranquilizing activity which comprises internally administering to animals an effective amount of a compound selected from the group consisting of a pyrimidine and a nontoxic pharmaceutically acceptable acid addition salt thereof, said pyrimidine having the following structural formula:

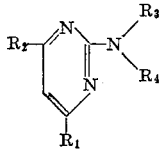

in which:

$R_1$ is a member selected from the group consisting of chlorine, bromine and methyl;
$R_2$ is a member selected from the group consisting of chlorine, methyl, ethyl, methoxy and trifluoromethyl;
$R_3$ is a member selected from the group consisting of hydrogen and methyl; and
$R_4$ is a member selected from the group consisting of hydrogen, methyl, ethyl, propyl, isopropyl and cyclopropyl.

6. The method in accordance with claim 5 in which 2-(N,N-dimethylamino)-4-chloro-6-methylpyrimidine is administered.

7. A method of producing tranquilization which comprises internally administering to animals a daily dosage of from about 100 mg. to about 1600 mg. of a tranquilizer selected from the group consisting of a pyrimidine and a nontoxic pharmaceutically acceptable acid addition salt thereof, said pyrimidine having the following structural formula:

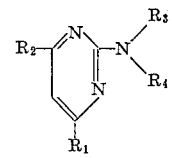

in which:

$R_1$ is a member selected from the group consisting of chlorine, bromine and methyl;
$R_2$ is a member selected from the group consisting of chlorine, methyl, ethyl, methoxy and trifluoromethyl;
$R_3$ is a member selected from the group consisting of hydrogen and methyl; and
$R_4$ is a member selected from the group consisting of hydrogen, methyl, ethyl, propyl, isopropyl and cyclopropyl.

8. A method of producing tranquilization which comprises internally administering to animals a daily dosage of from about 120 mg. to about 600 mg. of a tranquilizer selected from the group consisting of a pyrimidine and a nontoxic pharmaceutically acceptable acid addition salt thereof, said pyrimidine having the following structural formula:

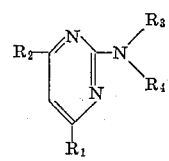

in which:

$R_1$ is a member selected from the group consisting of chlorine, bromine and methyl;
$R_2$ is a member selected from the group consisting of chlorine, methyl, ethyl, methoxy and trifluoromethyl;
$R_3$ is a member selected from the group consisting of hydrogen and methyl; and
$R_4$ is a member selected from the group consisting of hydrogen, methyl, ethyl, propyl, isopropyl and cyclopropyl.

9. The method in accordance with claim 7 in which a daily dosage of from about 100 mg. to about 1600 mg. of 2-(N,N-dimethylamino)-4-chloro-6-methylpyrimidine is administered.

10. The method in accordance with claim 7 in which a daily dosage of from about 100 mg. to about 1600 mg. of 2-amino-4-chloro-6-methylpyrimidine is administered.

11. A pharmaceutical composition having tranquilizing activity, in dosage unit form, comprising a pharmaceutical carrier and from about 25 mg. to about 400 mg. of a compound selected from the group consisting of 2-amino-4-chloro-6-methylpyrimidine and a nontoxic pharmaceutically acceptable acid addition salt thereof."

References Cited by the Examiner

Chem. Abst., vol. 55, p. 4515(b), 1961.
Chem. Abst., vol. 51, p. 2035(s), Subj. Index, December 1957, middle column.
Chem. Abst., vol. 51, p. 4385(h), 1957.
Chem. Abst., vol. 58, p. 4560(d), 1963.
Chem. Abst., vol. 55, p. 6603(d), 1961.

JULIAN S. LEVITT, *Primary Examiner.*

S. J. FRIEDMAN, N. G. MANN, P. L. SABATINE, *Assistant Examiners.*